(12) United States Patent
Stanhope et al.

(10) Patent No.: US 12,154,408 B2
(45) Date of Patent: Nov. 26, 2024

(54) GENERAL BACKEND SERVICE ARCHITECTURE FOR A NOVEL GAME DEVELOPMENT KIT (GDK)

(71) Applicant: Aristocrat Technologies, Inc., Las Vegas, NV (US)

(72) Inventors: John Stanhope, Las Vegas, NV (US); Alexander Appa, Las Vegas, NV (US); Eric Haberman, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 277 days.

(21) Appl. No.: 17/832,539

(22) Filed: Jun. 3, 2022

(65) Prior Publication Data

US 2023/0394912 A1    Dec. 7, 2023

(51) Int. Cl.
*G07F 17/32* (2006.01)
*G06F 8/20* (2018.01)

(52) U.S. Cl.
CPC ............ *G07F 17/3223* (2013.01); *G06F 8/20* (2013.01)

(58) Field of Classification Search
CPC .............................. G07F 17/3223; G06F 8/20
See application file for complete search history.

(56) References Cited

U.S. PATENT DOCUMENTS

| | | | |
|---|---|---|---|
| 6,530,840 B1 | 3/2003 | Cuomo | |
| 9,734,659 B2 | 8/2017 | Ovalle | |
| 10,475,290 B2 | 11/2019 | Ovalle | |
| 2006/0258438 A1* | 11/2006 | Platis | G07F 17/32 463/25 |
| 2008/0220870 A1* | 9/2008 | Zavolas | G07F 17/32 463/40 |
| 2009/0143128 A1* | 6/2009 | Cautley | G07F 17/329 463/17 |
| 2016/0104346 A1 | 4/2016 | Ovalle | |

(Continued)

FOREIGN PATENT DOCUMENTS

WO    2020148564 A1    7/2020

OTHER PUBLICATIONS

Office Action (Non-Final Rejection) dated Mar. 8, 2024 for U.S. Appl. No. 17/832,532 (pp. 1-5).

(Continued)

*Primary Examiner* — Werner G Garner
(74) *Attorney, Agent, or Firm* — Blank Rome LLP

(57) ABSTRACT

The innovations herein concern a general service architecture and flexible backend platform design for a novel game development kit (GDK). In particular, a hosted gaming platform may be used to provide backend data services to a number of different players and/or for a number of different games, such as slot games or other wagering games. Many slot games and other wagering games may be developed by many different gaming studios concurrently, and such games may have many shared components, as well as many unique or custom-developed components for a particular game. Thus, presented herein are techniques, devices, and software architectures to provide a novel GDK having a general service architecture and a flexible, platform-agnostic backend design to support customizable, composable, and interoperable game development.

20 Claims, 14 Drawing Sheets

(56) References Cited

U.S. PATENT DOCUMENTS

| | | |
|---|---|---|
| 2016/0110953 A1* | 4/2016 | Sotiriou .............. G07F 17/3227 463/25 |
| 2017/0228975 A1 | 8/2017 | Ovalle |
| 2017/0236365 A1 | 8/2017 | Ovalle |
| 2017/0250004 A1 | 8/2017 | Ovalle |
| 2017/0250005 A1 | 8/2017 | Ovalle |
| 2023/0230456 A1 | 7/2023 | Ovalle |
| 2023/0274382 A1 | 8/2023 | Fowler |
| 2023/0394914 A1 | 12/2023 | Morgan |

OTHER PUBLICATIONS

Office Action (Notice of Allowance and Fees Due (PTOL-85)) dated Jun. 3, 2024 for U.S. Appl. No. 17/832,532 (pp. 1-9).

* cited by examiner

GENERAL BACKEND SERVICE ARCHITECTURE FOR A NOVEL GAME DEVELOPMENT KIT (GDK)

TECHNICAL FIELD

The present application concerns a general service architecture and flexible backend platform design for a novel game development kit (GDK). In particular, a hosted gaming platform may be used to provide backend data services to a number of different players and/or for a number of different games, such as slot games or other wagering games.

BACKGROUND

Electronic gaming devices, such as electronic gaming machines (EGMs), computers, or other mobile devices, can provide a variety of wagering games such as slot games, video poker games, video blackjack games, roulette games, video bingo games, keno games and other types of games that are frequently offered at casinos and other locations. Play on electronic gaming devices typically involves a player establishing a credit balance by inputting money, or another form of monetary credit and placing a monetary wager (from the credit balance) on one or more outcomes of an instance (or single play) of a primary or base game.

"Slot"-type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

Slot games and other wagering games may be developed by many different gaming studios concurrently, and such games may have many shared components, as well as many unique or custom-developed components for a particular game. Thus, it would be beneficial, from a game development standpoint, to provide a novel game development kit (GDK) having a general service architecture and a flexible, platform-agnostic backend design, as well as a modular frontend design environment, to support the development of customizable, composable, and interoperable games.

DETAILED DESCRIPTION

I. Introduction

I.A. Overview

Figure 1:
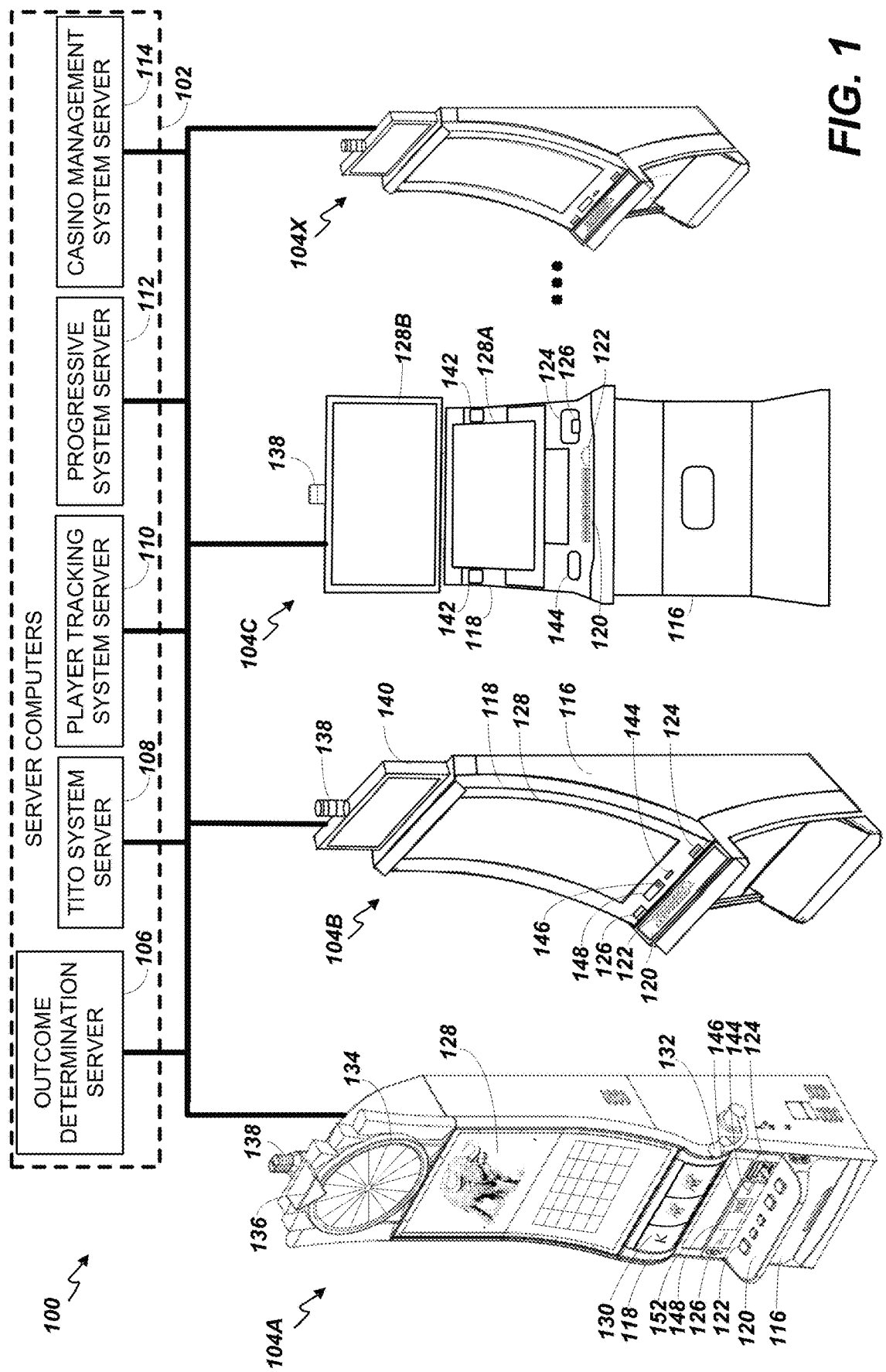
FIG. 1 is an exemplary diagram showing several EGMs networked with various gaming-related servers.

The disclosed technology is directed to several features of electronic gaming devices and development systems and tools for games to be played on such electronic gaming devices. For example, a general service architecture and flexible backend platform design for a novel game development kit (GDK) are disclosed. Generally speaking, there may be three main types of components in the backend platform (i.e., in addition to the backend platform component itself): service adapters; storage adapters; and game backend systems (e.g., slot game backends). These components may be intentionally sandboxed from each other, thereby allowing them to execute without interdependence on one another, and providing game developers the ability to use different version libraries, thereby allowing a more flexible development environment for game developers. In some embodiments, the backend platform may have an improved technical design, such that modifications may be made, e.g., by developers, to one or more of: the service adapter; the storage adapter; or the game backend systems— without causing a need to recompile the other unmodified portions of the backend platform. In some such embodiments, this may be achievable by the various components residing within their own code libraries.

In another example, a frontend game development platform is disclosed, wherein games developed by the frontend game development platform comprise: a composable state machine having a plurality of states, and wherein each of the plurality of states supports customizable game logic and a plurality of triggers. In prior art GDK slot game engines, games adhered to a fairly rigid structure that did not easily accommodate custom game functionality provided by a game developer. As a result, the developer would often need to override large portions of the game engine, duplicate existing code—often with minor changes—and need to understand the potentially complex interactions and expectations of the different stages in a given game in order to implement custom game functionality. This innovation provides an improved technical design, with a more flexible frontend game (e.g., slot game) development platform and game engine that provides developers with the ability to easily insert their own custom logic steps or stages into outcome calculation and game flow and presentation. In addition, the improved game engine will provide the ability to have game execution flow defined externally—and in a way that it may be modified without the need for a recompilation of game binaries with each modification. In some such embodiments, this may be achievable by the various frontend game components residing within their own configuration files.

The innovations disclosed herein can be implemented as part of a method, as part of an electronic gaming device, such as an EGM or mobile device, or on an electronic gaming server or other computer server(s) configured to perform the method, or as part of non-transitory computer-readable media storing computer-executable instructions for causing one or more processors in a computer system to perform the method. The various innovations can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures and illustrates a number of examples. Examples may also be capable of other and different applications, and some details may be modified in various respects all without departing from the spirit and scope of the disclosed innovations.

I.B. General Considerations

The detailed description presents innovations in electronic gaming machines ("EGMs") and other electronic gaming devices and computer-implemented systems. Various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Some of the innovations described herein address one or more of the problems noted in the background. Typically, a given technique/tool does not solve all such problems. It is to be understood that other examples may be utilized and that structural, logical, software, hardware, and electrical changes may be made without departing from the scope of the disclosure. The following description is, therefore, not to be taken in a limited sense. Rather, the scope of the present disclosure is defined by the appended claims.

The innovations described herein may, among other things, execute a hosted gaming platform, wherein the hosted gaming platform comprises: a service adapter; one or more storage adapters; and one or more game backend systems (e.g., an extensible slot game engine). The hosted gaming platform may receive, at the service adapter, a request from a frontend gaming service, wherein the request comprises at least a player identifier (ID) and an application ID and, in response to the request, connect, by the service adapter, to at least one of the one or more storage adapters using the player ID and the application ID. The hosted gaming platform may then receive, from the at least one of the one or more storage adapters, information responsive to the request and execute the request on at least one of the one or more game backend systems to produce one or more results, wherein the execution of the request is based, at least in part, on the information received from the at least one of the one or more storage adapters, and wherein the at least one of the one or more game backend systems comprises a composable state machine having a plurality of states, and wherein each of the plurality of states supports customizable game logic. Finally, the one or more results may be returned to the frontend game service, so that the game may take the appropriate action (e.g., updating the game's display with new A/V data).

In some embodiments, the hosted gaming platform may be hosted on a third-party cloud service provider or one or more local servers. In other embodiments, the hosted gaming platform may comprise a multi-threaded architecture. In still other embodiments, each of the one or more storage adapters may be connected to an external database (e.g., different types and/or vendors of external databases). In yet other embodiments, the frontend gaming service may be configured to connect to the hosted gaming platform via one or more of: a Representational State Transfer (REST) Application Programming Interface (API), a Web Socket, or a Protocol Buffer.

In some embodiments, the hosted gaming platform further comprises a Math Verification Controller (MVC). In other embodiments, the request received at the service adapter may comprise at least one of the following types of requests: a spin request; a jackpot request; or a join request. In still other embodiments, each of the plurality of states is removable, re-writable, and re-orderable.

II. Example Electronic Gaming Servers and Electronic Gaming Machines or Devices

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.), which server computers 102 can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet, through a web site maintained by a computer on a remote server, or over an online data network, including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementations, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure while connected locally to a machine hosting the aforementioned gaming platform. In some such cases, the local machine(s) hosting the gaming platform may be within the gaming device 104. However, it is typical to find multiple electronic gaming devices connected to networks implemented with one or more of the different server computers 102 described herein.

II.A. Example Server Computers

The server computers 102 may include an outcome determination server 106, e.g., a central determination gaming system server, a multimedia content distribution server, or other type of backend server (examples of which will be discussed in greater detail below), a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on an outcome determination server 106 and then transmitted over the network to any of a group of remote terminals or remote gaming devices 104A-104X that utilize the game outcomes and display the results to the players.

II.B. Example Gaming Devices

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
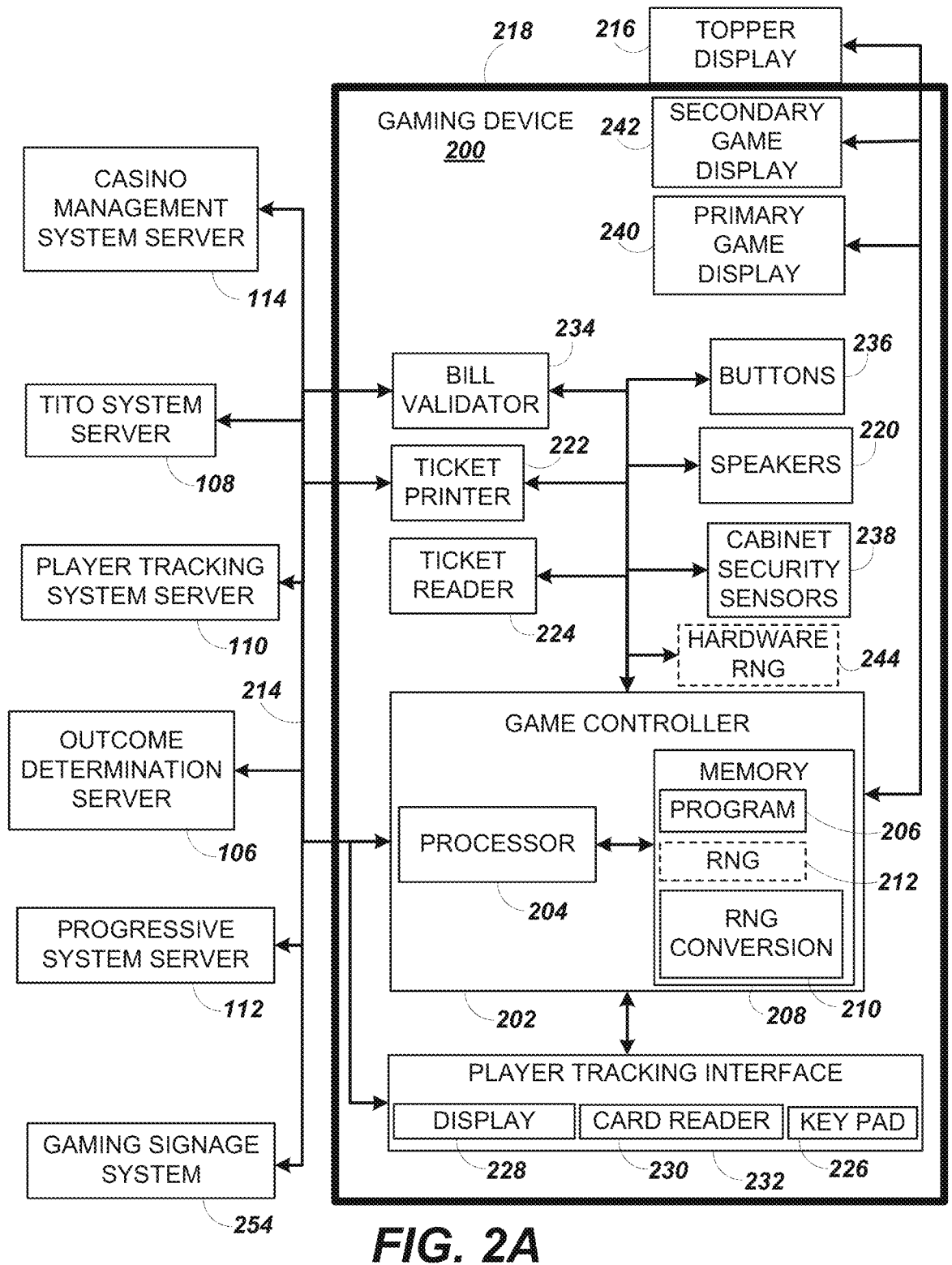
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

II.C. Example Components of Gaming Devices

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as an outcome determination server 106 (also shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200.

In some embodiments, the outcome determination server 106 may comprise a multi-threaded architecture, allowing multiple connections and/or game instances to utilize the outcome determination server 106. In some implementations, e.g., wherein the outcome determination server 106 is hosted at a cloud service provider, the amount of resources at the cloud service provider that are dedicated to a particular game (e.g., number of servers, number of threads, amount of memory, bandwidth, etc.) may be scaled dynamically to accommodate the real-time needs of the hosted game. When a game is stored on gaming device 200, it may be loaded from memory 208 (e.g., from a read only memory (ROM)) or from the outcome determination server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features. It is to be understood that, in certain embodiments, one or more of the functions described above as being performed by game controller 202 (e.g., the RNG functionality, game program storage and/or execution, etc.) may also be performed in whole, or in part, by a hosted server platform, such as outcome determination server 106 or other servers. As will be explained in more detail below, in some embodiments, a client/server architecture may be employed with a game front end application passing requests and other information to a game backend layer, via an application service layer.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS ° system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

II.D. Example Gaming Environment

Figure 2B:
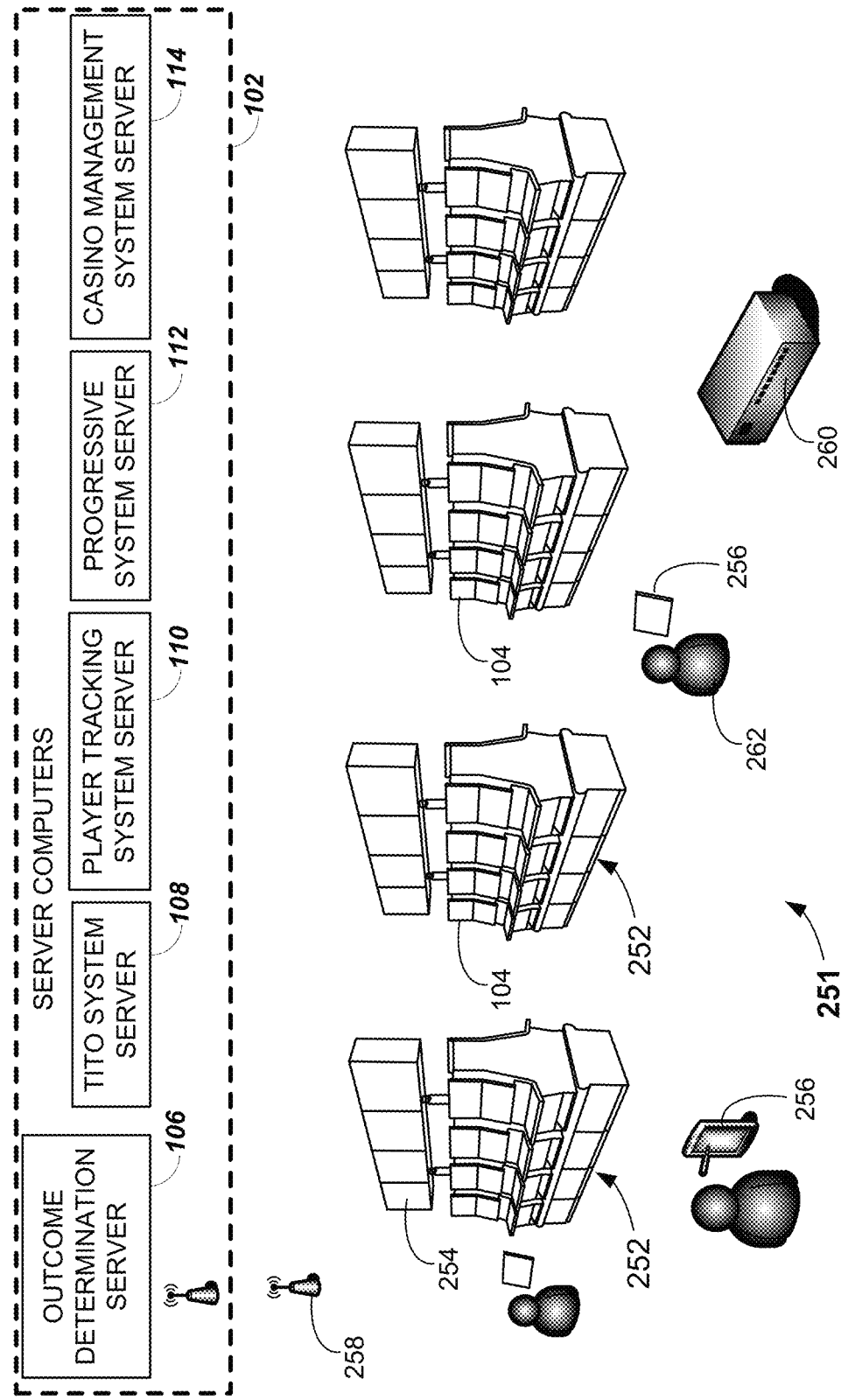
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258. In other examples, the mobile gaming devices 256 may also be configured for communication with one or more other devices external to the casino 251, e.g., players located elsewhere in a particular city, elsewhere in a particular state, at a particular casino's other locations, and so forth.

According to some examples, the mobile gaming devices 256 may be configured for stand-alone determination of game outcomes. However, in some alternative implementations the mobile gaming devices 256 may be configured to receive game outcomes from another device, such as the outcome determination server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

II.E. Example Distributed Gaming Delivery

Figure 2C:
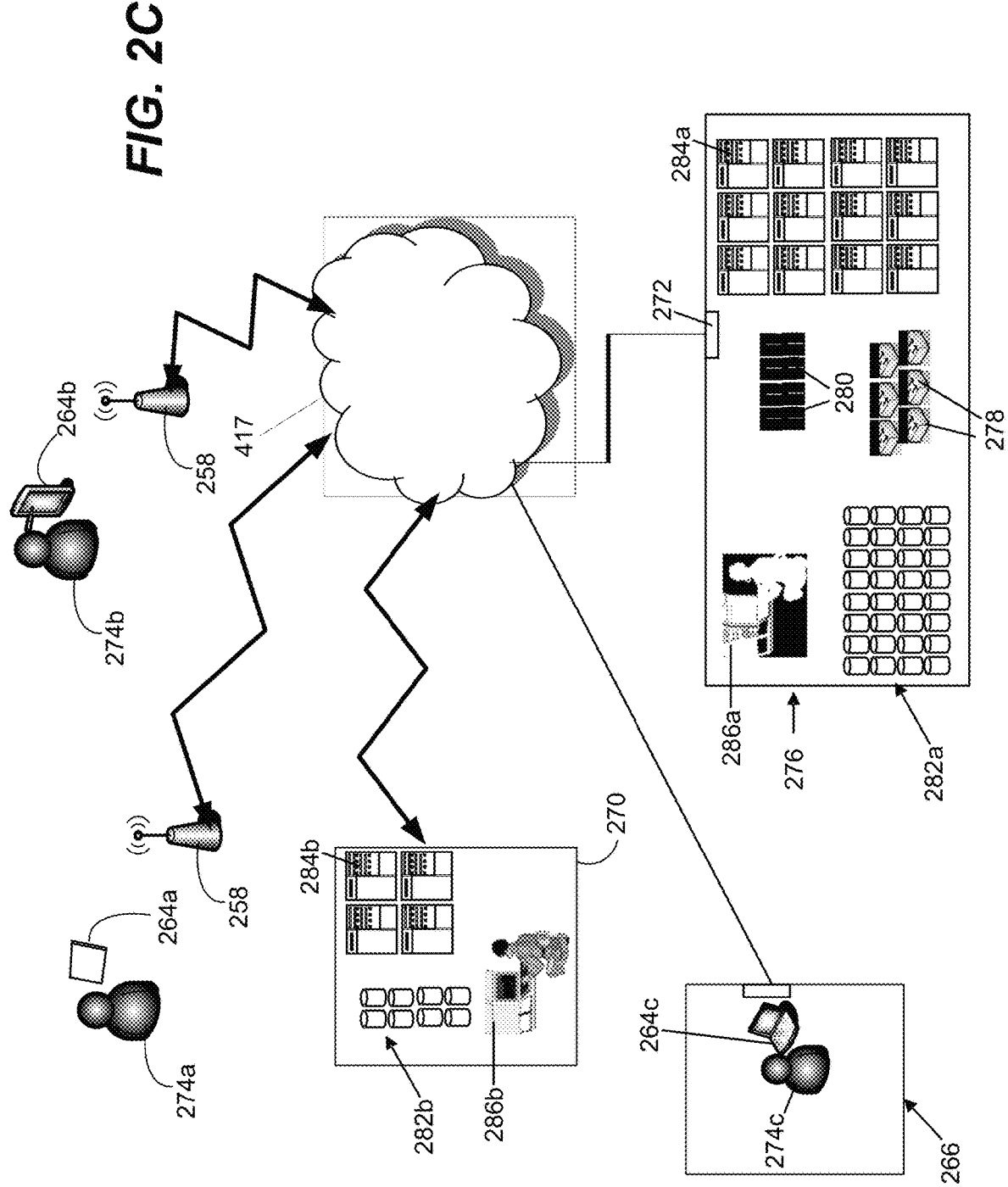
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264a, 264b and 264c are capable of communication via one or more networks 417. The networks 417 may, for example, include one or more cellular telephone networks, the Internet, etc. In this example, the EUDs 264a and 264b are mobile devices: according to this example the EUD 264a is a tablet device and the EUD 264b is a smart phone. In this implementation, the EUD 264c is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser.

Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272, including and one or more workstations 286a. In this example, switches 278 and routers 280 are configured to provide network connectivity for devices of the gaming data center 276, including storage devices 282a, servers 284a and one or more workstations 570a. The servers 284a may, for example, be configured to provide access to a library of games for online game play. In some examples, code for executing at least some of the games may initially be stored on one or more of the storage devices 282a. The code may be subsequently loaded onto a server 284a after selection by a player via an EUD and communication of that selection from the EUD via the networks 417. The server 284a onto which code for the selected game has been loaded may provide the game according to selections made by a player and indicated via the player's EUD. In other examples, code for executing at least some of the games may initially be stored on one or more of the servers 284a. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284b, storage devices 282b, and one or more workstations 286b. According to this example, the financial institution data center 270 is configured to maintain financial accounts, such as checking accounts, savings accounts, loan accounts, etc. In some implementations one or more of the authorized users 274a-274c may maintain at least one financial account with the financial institution that is serviced via the financial institution data center 270.

According to some implementations, the gaming data center 276 may be configured to provide online wagering games in which money may be won or lost. According to some such implementations, one or more of the servers 284a may be configured to monitor player credit balances, which may be expressed in game credits, in currency units, or in any other appropriate manner. In some implementations, the server(s) 284a may be configured to obtain financial credits from and/or provide financial credits to one or more financial institutions, according to a player's "cash in" selections, wagering game results and a player's "cash out" instructions. According to some such implementations, the server(s) 284a may be configured to electronically credit or debit the account of a player that is maintained by a financial institution, e.g., an account that is maintained via the financial institution data center 270. The server(s) 284a may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers. In still other examples, as will be explained in further detail below, one or more third party cloud-based service providers may be utilized by a given casino, a given game developer, or given game studio to host backend game functionality for a number of different games (and/or a number of different players) simultaneously, according to a general service architecture and flexible backend platform design implementing a novel GDK to enhance and componentize game development.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274a-274c), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

II.F. Example Game Processing Architecture

Figure 3:
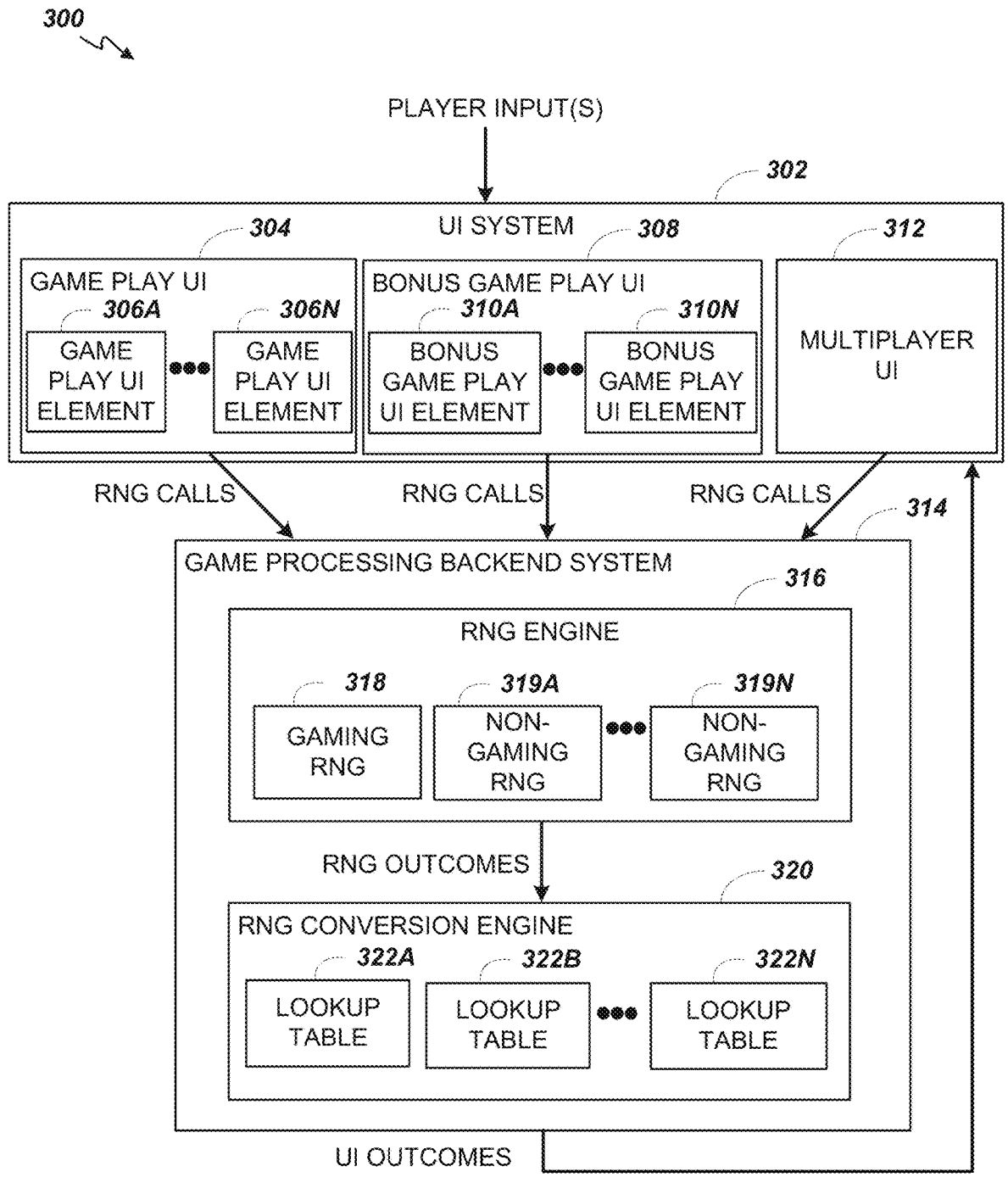
FIG. 3 illustrates, in block diagram form, an implementation of a game processing architecture algorithm that implements a game processing pipeline for the play of a game, in accordance with various implementations described herein.

FIG. 3 illustrates, in block diagram form, an implementation of a traditional, i.e., non-hosted, game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, as will be discussed in further detail below, portions of the gaming processing architecture 300 can implement the game processing pipeline using a gaming device and one or more remote gaming devices, such as outcome determination server 106 shown in FIG. 1. In such implementations, the game processing pipeline may also utilize one or more game service clients, e.g., to pass inputs and requests between the gaming device/gaming application and the backend gaming system server that is hosting aspects of the game's functionality.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. (As mentioned above, in embodiments wherein aspects of the game's functionality are hosted by a backend server, the UI outcomes may be determined by the hosted game backend and then returned to the game via an application service layer so that the game application may update the appropriate audio and/or visual gameplay elements.) Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

III. Example Embodiments

III.A General Service Architecture and Flexible Backend Platform Design for a Novel Game Development Kit (GDK)

Figure 4:
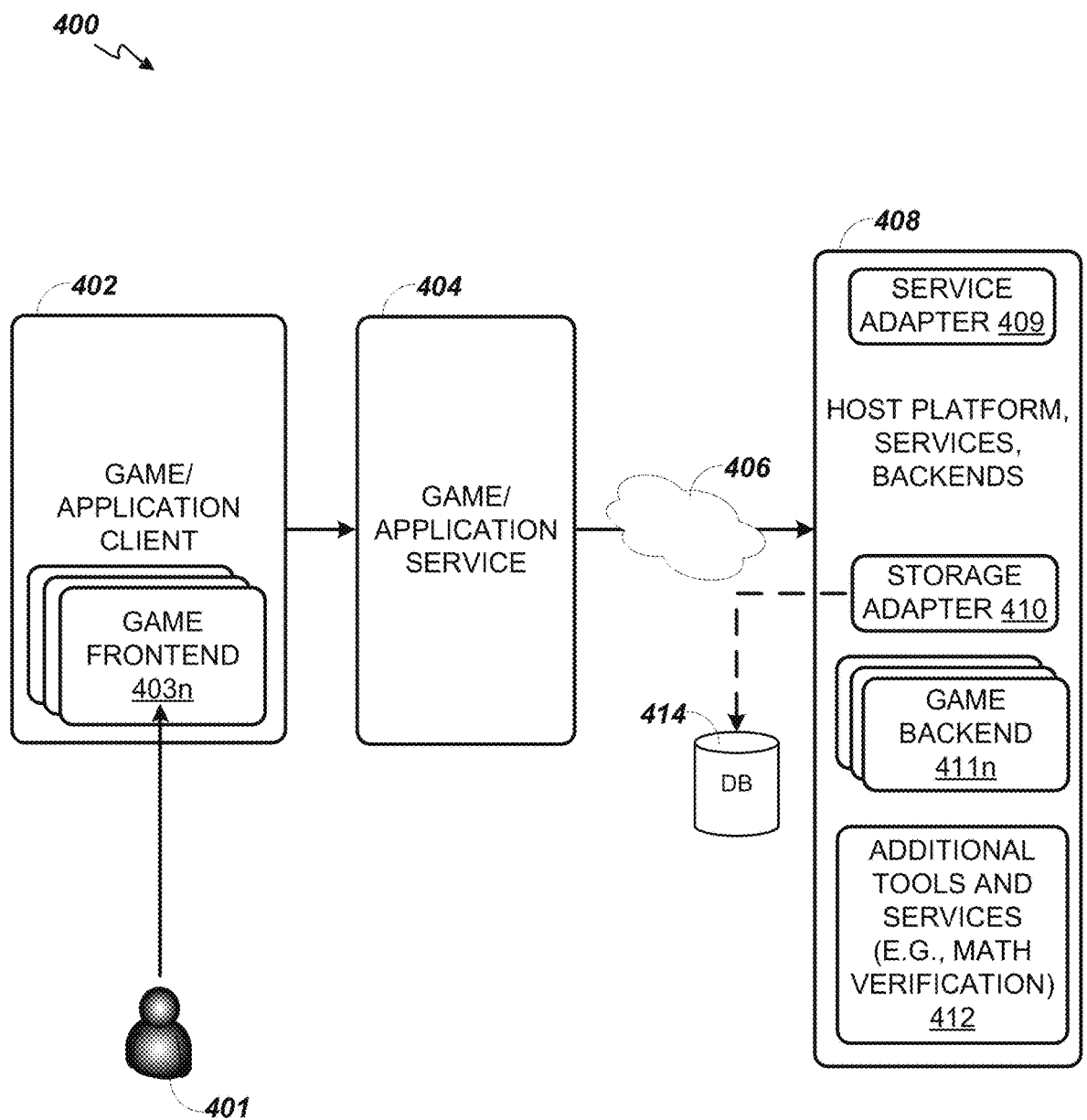
FIG. 4 illustrates, in block diagram form, an implementation of a general service architecture and flexible backend platform design for a novel GDK, in accordance with various implementations described herein.

Turning now to FIG. 4, an implementation 400 of a general service architecture and flexible backend platform design for a novel GDK are illustrated, in accordance with various implementations described herein. Beginning at the left-hand side of FIG. 4, a player 401 may engage or interact with a game application client 402. The game application client 402 may provide access to one or more game frontends ($403_1 \ldots 403_n$). For example, the game frontends may comprise frontend interfaces for different games, such as Buffalo Grand, Miss Kitty, Dragon Link, Five Dragons, etc. The game front ends 403, in addition to displaying information related to the game and storing relevant game-related content, may utilize a game/application service client 404 to take input information from the player (e.g., amount of bets, lines played, etc.) and pass it to the host platform 408, wherein various services and game backends may be hosted. As described above, in some implementations, the transmission of information between the frontend components and the backend components of the gaming environment may take place over one or more communication networks 406, such as over the Internet, through a web site maintained by a computer on a remote server, or over an online data network, including commercial online service providers, Internet service providers, private networks (e.g., local area networks and enterprise networks), and the like (e.g., wide area networks).

According to some embodiments, a host platform 408 may be comprised of multiple open APIs, whose purpose is to expose the math and game logic of different games to different services, such as storage and the game itself. One aim of the backend platform architecture is to be able supply functionality to the game/application service client 404 with horizontally-scalable services and the ability to operate across multiple platforms, technology stacks, machines, interfaces, etc. According to some embodiments, the backend host platform can facilitate several different backends that are either functionally separate or are physically distinct from one another.

As shown in FIG. 4, according to some embodiments, hosted platform 408 may comprise a service adapter (409); one or more storage adapters (410) configured to connect and obtain/store data in one or more external databases (414); and one or more game backend systems ($411_1 \ldots 411_n$). The role of service adapter, 409, according to some embodiments, is to contain the business logic for interacting with an application's backend service, dependency services, and associated games. The role of a storage adapter, 410, according to some embodiments, is to be able to interface with the game's respective storage system (e.g., various types of external databases 414). Finally, the role of the game backends 411, according to some embodiments, is to encapsulates the business logic for a given service, including core concepts, such as the state machine, Par sheets, and mathematical calculations needed for a given application/game.

According to some embodiments, the host platform 408 may also host various other additional tools and services (412), not necessarily directly related to player game play, e.g., a math verification controller (MVC)/agent, code development tools, game templates, tutorials, and other quality and/or validation tools that may be used during the development and/or testing of games. Preferably, host platform 408 provides an extensible platform designed to handle the current scenarios in a game but is also flexible enough to account for future developments. In some embodiments, the host platform 408 may use libraries, e.g., dynamically linked libraries (DLLs), to ensure the functionality and interoperability of the platform, including defining APIs between itself and storage adapters and service adapters, as needed.

III.B. Host Platform, Services, and Backends

Figure 5:
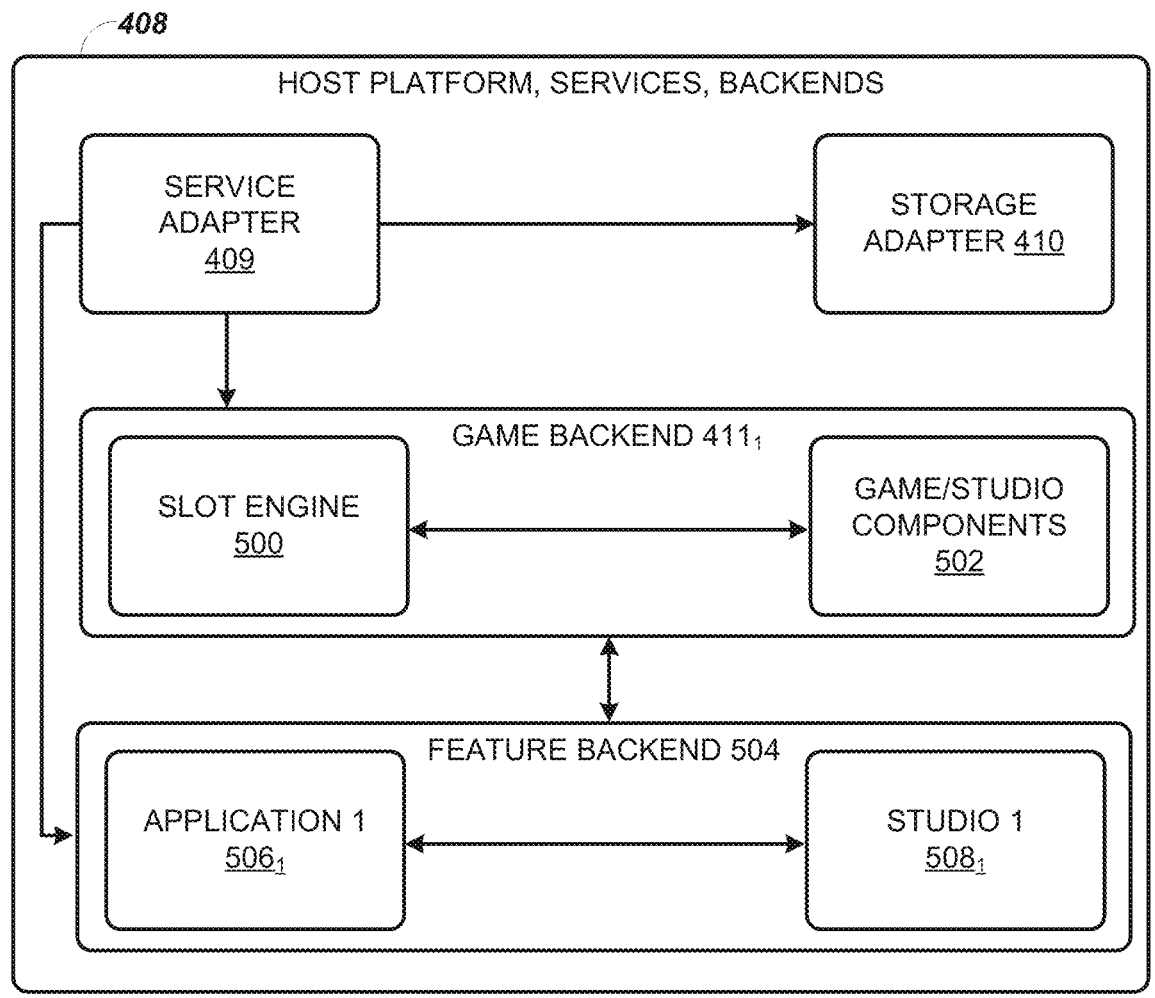
FIG. 5 illustrates, in block diagram form, an implementation of a flexible backend platform for a novel GDK, in accordance with various implementations described herein.

Turning now to FIG. 5, an implementation of a flexible backend platform for a novel GDK 408 is illustrated in greater detail in block diagram form, in accordance with various implementations described herein. As discussed above, according to some embodiments, a service adapter 409 contains the business logic for interacting with an application/game's backend service (e.g., 411), dependency services, such as storage adapters (410), and associated game backend modules (411). In some embodiments, e.g., slot-based games, the game backend modules (411) may comprise a standard (or extended) slot game engine (500), as will be described in greater detail below, as well as one or more customize game/studio-developed components (502) that either supplement or modify the functionality of the slot game engine 500. In some embodiments, service adapter 409 may also interact directly with an individual game feature backend 504 (e.g., a jackpot feature that is a common piece to the backend platform and that may, for example, make calls to the slot engine 500 of game backend 411). Game feature backend 504 may comprise, e.g., an application (e.g., represented by Application 1 $506_1$) and/or one or more custom game/studio-developed features (e.g., represented by Studio 1 $508_1$) for implementing the feature in one or more games.

Figure 6:
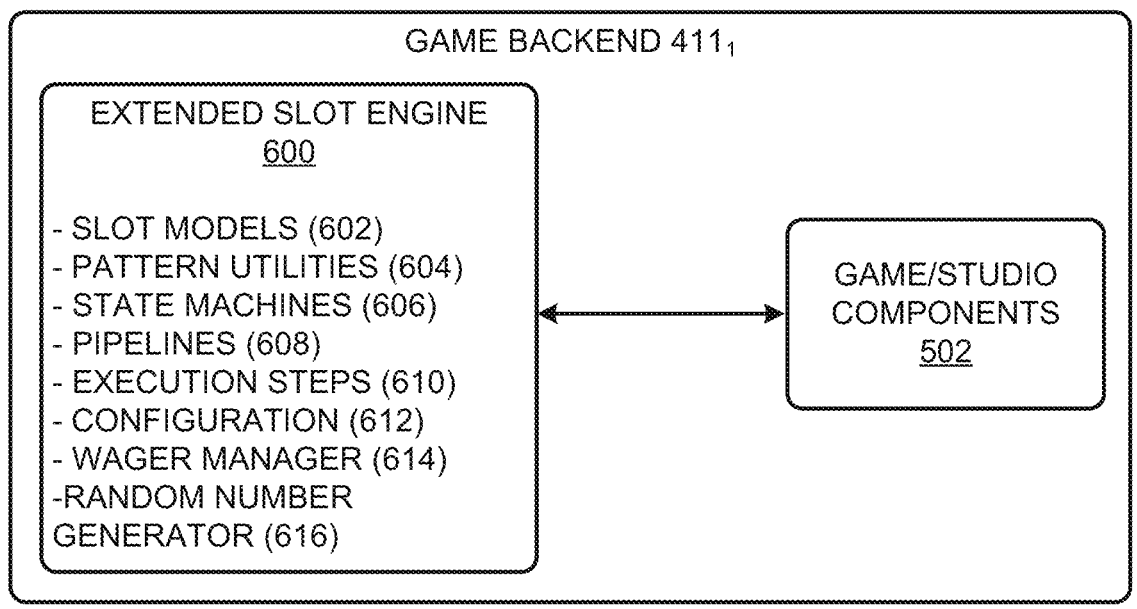
FIG. 6 illustrates, in block diagram form, an implementation of a game backend module, in accordance with various implementations described herein.

Turning now to FIG. 6, an implementation of a game backend module $411_1$ is illustrated in greater detail in block diagram form, in accordance with various implementations described herein. As described above, the game backend modules (e.g., $411_1$) may comprise an extended slot game engine (600), in addition to one or more customize game/studio-developed components (502) that either supplement or modify the functionality of the slot game engine 500. In the example illustrated in FIG. 6, extended slot game engine (600) comprises the following components: one or more slot models (602); pattern utilities (604); state machines (606); game pipelines (608); execution steps (610); configurations (612); a wager manager (614); and/or random number generators (RNGs) (616), such as a cryptographic RNG.

In some examples, the pattern utilities (604) may comprise one or more of: a pattern generator; a pattern matcher; or a paytable processor. The pattern generator may be used to help create or handle patterns (e.g., in the case of "paylines" or "way"). In the case of paylines, the pattern generator may extract symbols from the reel window and map them with paylines. In the case of ways, by having a reel window definition and knowing how many reels are enabled, the pattern generator can create patterns (e.g., with symbols) to later be processed for matches against winning combinations. In this way, the functionality of the games is further decoupled from the specific game's logic, thereby easing further development. A pattern matcher may be used to check if any patterns (e.g., paylines or ways) match against winning combinations. By decoupling this component, the creation of different types of pattern matchers could be made easier for developers, for both specific well-known types of pattern matches (e.g., Left-to-Right or Right-or-Left matches), as well as new customized pattern match types (e.g. an "edge matcher"). A paytable processor may be used validate each paytable record after matches are determined, consolidate any wins, and return consolidated results to the player. By decoupling this component, it will be easier for developers to handle and extend results by type and provided extend functionality, as results will be created in a clear and well-structured manner, thereby easing the identification of results types, such as credits or features. In general, decoupling these components will result in cleaner code, the ability to implement common software design patterns, and to avoid many instances of unnecessarily duplicated code.

Any one or more of the above-enumerated slot engine components may be extended (e.g., modified or customized) by a game studio/developer. For example, as will be discussed in further detail below with reference to FIG. 7, a game studio may modify or customize the order of execution steps for a particular game from the default slot engine behavior and/or re-write one or more individual execution steps for the particular game (e.g., adding additional symbols, adding additional reel positions, checking paylines in a different direction, processing player rewards in a different way, etc.). In some embodiments, execution steps may be implemented as a software code class configured to take a context created for the given game backend, e.g., based on the current player ID and other data, and then take the appropriate actions upon such player's data.

Figure 7:
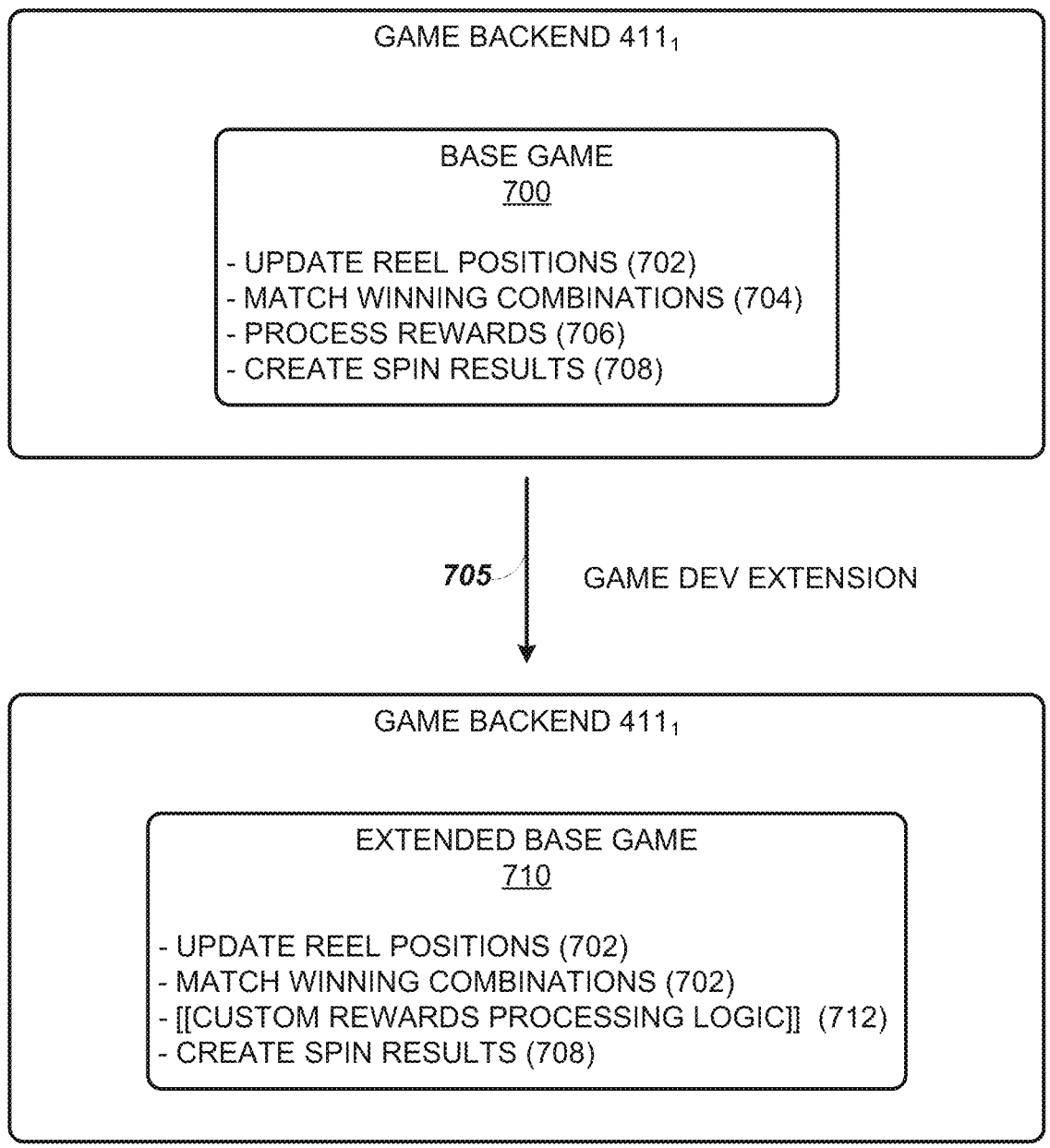
FIG. 7 illustrates, in block diagram form, an implementation of an extended game backend module, in accordance with various implementations described herein.

Turning now to FIG. 7, an implementation of an extended game backend module 710 is illustrated in greater detail in block diagram form, in accordance with various implementations described herein. Looking again at game backend module 411₁, an exemplary base game 700 (e.g., a slot-based game leveraging components of an existing slot game engine) may comprise a set of execution steps in a particular order to define the game play of base game 700, e.g.: an update reel positions step (702); followed by a match winning combinations step (704), followed by a process rewards step (706), followed by a create spin results step (708). In the case that a game studio/developer extends the base game 700 (see arrow 705), an extended base game (710) may be created within the game backend module 411₁. For example, in FIG. 7, the process rewards step (706) of the base game implementation has been replaced or extended with a customized rewards processing logic component (712), developed by the game studio/developer. In this example, the extended base game may differentiate, e.g., how rewards are paid to a player based on their bet amount, customer loyalty status, etc. Advantageously, the modifications to customized rewards processing logic component (712) may be made without disturbing or recompiling the other portions of the game's execution pipeline, and may easily be duplicated, shared, removed, further customized, etc., for increased game diversity and player enjoyment. It is to be understood that rewards logic is but one example of a kind of game component for which customized gameplay and/or processing logic may be replaced or extended by a developer.

III.C. Gaming Front End Components and Customization

Figure 8A:
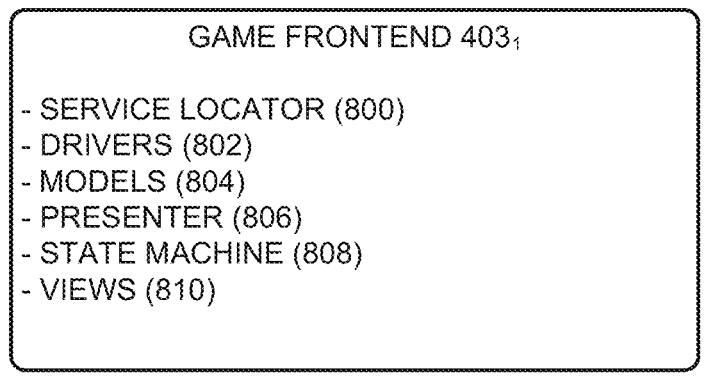
FIG. 8A illustrates, in block diagram form, an implementation of a game frontend module, in accordance with various implementations described herein.

Turning now to FIG. 8A an implementation of a game frontend module 403₁ is illustrated, in block diagram form, in accordance with various implementations described herein. Exemplary game frontend module 403₁ may comprise various components, such as: a service locator (800); drivers (802); models (804); presenters (806); a state machine (808); and various views (810).

According to some implementations, as will be explained in further detail in connection with FIG. 8C, below, the state machine (808) for a particular game may comprise a collection of defined states having predefined triggers and transitions to other states that is used control the logical flow of the game. In a model-view-presenter (MVP) software pattern, the models (804) may be thought of as internal representations of the backend state of the game, the views (810) may represent the various audio/visual (A/V) components of the game, and the presenters (806) may serve as "middle-men" in the UI presentation workflow, reading data from models or game states and choreographing the sending of the appropriate data to the correct views.

According to some implementations, the drivers (802) may be used to request and receive responses from a game client and pass them to the appropriate model (804). The service locator (800) may be used to read data from models or the game state and control the sending of data to the appropriate views (810), e.g., by leveraging the use of tags to locate particular components.

Figure 8B:
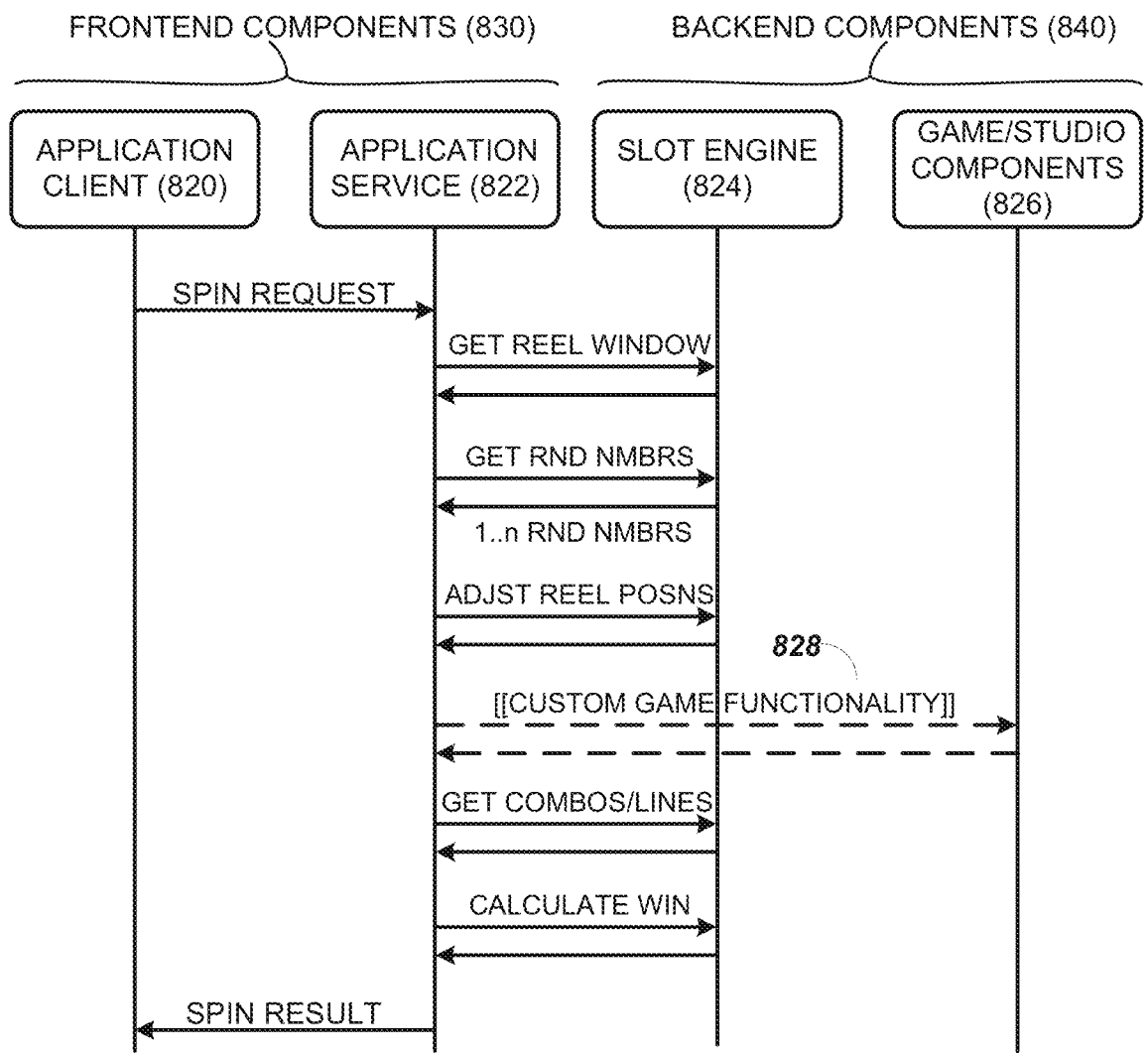
FIG. 8B illustrates, in process flow diagram form, an exemplary set of operations being performed by various frontend and backend components of a hosted gaming platform, in accordance with various implementations described herein.

FIG. 8B illustrates, in process flow diagram form, an exemplary set of operations being performed by various frontend and backend components of a hosted gaming platform, in accordance with various implementations described herein. The two left-most "lanes" in the process flow diagram in FIG. 8B relate to the frontend system components (830): application client (820) and application service (822). The two right-most "lanes" in the process flow diagram in FIG. 8B relate to the backend system components (840): slot game engine (824) and game/studio components (826). The aim of FIG. 8B is to illustrate the different roles and interactions of the various system components when processing an exemplary request, such as the "Spin Request" that is illustrated in FIG. 8B.

First, the application client (820) (which may, e.g., comprise a generic slot game client with multiple individual slot game clients nested inside of it) may send the exemplary Spin Request to an application service (822). As explained above, application service (822) may use the frontend framework to take input from player and then return results, such as the results of spins, for display to the player in the application client. In this example, the process of performing the Spin Request may comprise several serialized calls to the backend slot engine (824) API. For example, the API calls to the backend slot engine (824) API may comprise: 1.) a "Get Reel Window" call that returns the current state of the reels in the game; 2.) a "Get Random Numbers" call that returns from 1 up to n randomly-generated numbers, which may be used to, e.g., determine reel positions, prizes, free game awards, etc.; and 3.) an "Adjust Reel Positions" call to update the reel positions in the application client, e.g., based on the random numbers that were determined by the get random numbers call. At 828 in this example, the application service 822 may deviate from a "default" engine gameplay flow, and instead call some custom game functionality implemented within the aforementioned game/studio components (826). For example, the custom game functionality (828) in this example could make the reels stop in a Right-to-Left order, rather than the default Left-to-Right order, or the like.

Next, the API calls to the backend slot engine (824) API may comprise: 5.) a "Get Combos/Lines" call that causes the backend slot engine (824) to return each of the combinations of reel symbols appearing on paylines after the completion of the latest spin; and 6.) a "Calculate Win" call that implements the game engine's math and game logic to determine what the player's winnings are for the current spin, given the current bet level and the various combinations/lines showing on the reels. Once the reel positions and winnings (and any other data relevant to the current spin) are calculated and returned to application service (822), the "Spin Results" may be returned to application client (820) so that, e.g., the appropriate audio/visual aspects of the game's display may be updated and indicate to the user the results of the latest spin.

It is to be understood that FIG. 8B provides but one example of a request that may be handled by the various hosted gaming platform embodiments disclosed herein.

Other types of requests may be handled, and additional pieces of game logic may be overwritten, extended, removed, etc., by individual game studio/developers, as is desired for a particular game.

As one example, the following service execution flow definitions for an exemplary game may be stored in a JSON (or other standardized) file format:

```
{
  "services": [ {
    "spin" : [
      { "function":    "GDK.GetReelWindow" },
      { "function":    "GDK.GetRandomNumber" },
      { "function":    "GDK.AdjustReelPosition" },
      { "function":    "GameLibrary.CustomGameFunction" },
      { "function":    "GDK.GetCombinations" },
      { "function":    "GDK.GetLines" },
      { "function":    "GDK.CalculateWin" }
    ]
  }, {
    "triggerFeature": [
      { "function":    "GDK.SetRandomNumbers" },
      { "function":    "GDK.GetReelWindow" },
      { "function":    "GDK.GetRandomNumber" },
      { "function":    "GDK.AdjustReelPosition" },
      { "function":    "GameLibrary.CustomGameFunction" },
      { "function":    "GDK.GetCombinations" },
      { "function":    "GDK.GetLines" },
      { "function":    "GDK.CalculateWin" }
    ]
  } ]
}
```

The service execution flow examples reproduced above show the function call "recipes" for performing exemplary game services, such as "Spin" and feature services, such as a "Trigger Feature." Notably, within the "Spin" service, the fourth function call, "GameLibrary.CustomGameFunction" represents a custom piece of game functionality that may have been added by a particular developer, analogous to the custom game functionality (828) of FIG. 8B, discussed above. Similarly, within the "Trigger Feature" service, the fifth function call, "GameLibrary.CustomGameFunction" represents custom functionality that may be involved in a particular game's implementation of a particular trigger feature, while the other functions in the service recipe comprise "default" or "standard" function calls available in a base game engine package.

Figure 8C:
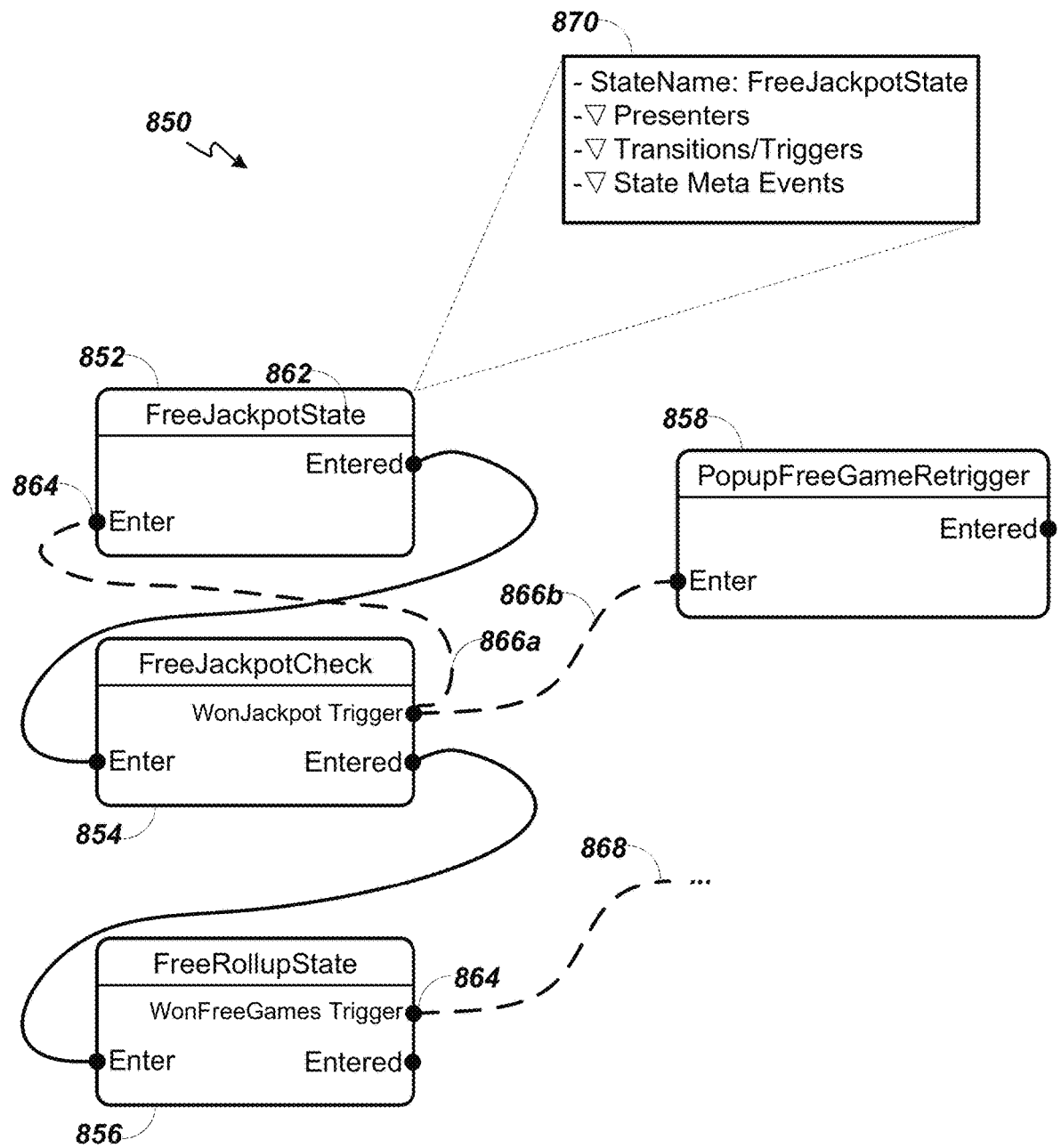
FIG. 8C illustrates, in a state machine diagram form, an implementation of a game frontend development module, in accordance with various implementations described herein.

Turning now to FIG. 8C, a game frontend development module is illustrated in a state machine diagram form, in accordance with various implementations described herein. As illustrated in FIG. 8C, the exemplary state machine 850 comprises various states, e.g.: FreeJackpotState (852); FreeJackpotCheck (854); FreeRollupState (856); and PopupFreeGameRetrigger (858). Each state may have a state name (862), one or more triggers (864), and a set of associated properties (870), such as associated presenters, transition/trigger specifications, state meta events (which may, e.g., help to transfer player information, such as a remaining balance, between various games in a multi-game lobby), and/or various other properties that may be relevant to a particular state as a game developer is working on a game frontend development platform.

According to some implementations, a state may start an asynchronous "co-routine" process that executes an internal chain of software code routines that chain to particular presenters, each of which may have their own asynchronous components. In some embodiments, the software code can even be configured to partially execute a particular function and then return control flow. In some embodiments, individual functions can also be canceled, resulting in the cancellation of every other partially-executed function in the chain. In some embodiments, certain states could also serve as blocking states for downstream functions (e.g., a network request may have to complete before a particular animation request, e.g., a reel quick stop request, may be acted upon by the game, and so forth).

In the exemplary state machine 850, the FreeJackpotState (852) state is shown as having "Enter" and "Entered" triggers. For example, when the FreeJackpotState (852) state is entered, the exemplary state machine 850, as illustrated, directs the game flow to enter the FreeJackpotCheck (854) state. When the FreeJackpotCheck (854) state is entered, the game flow may proceed to enter FreeRollupState (856), while also listening for or subscribed to the "WonJackpot" trigger (860). Via the game frontend development module, a game developer may customize the workflow of a given game in any desired fashion, e.g., connecting the "WonJackpot" trigger to return back to the FreeJackpotState (852) (as is shown by dashed line 866*a*), or alternately connecting the "WonJackpot" trigger to enter the PopupFreeGameRetrigger (858) (as is shown by dashed line 866*b*), and so forth.

It is to be understood that the states and triggers shown in exemplary state machine 850 are merely illustrative, and many additional states and transitions between states based on one or more triggering events could be possible, depending on the complexity and desired gameplay of a particular game (e.g., the "WonFreeGame" trigger 864 could be connected, via dashed line 868, to additional states not illustrated here, for simplicity). As discussed above, according to some embodiments, developers may have the opportunity to use existing states/presenters as part of a standard game engine (e.g., slots game engine), and/or they may overwrite or customize particular states, or add entirely new states, based on the design of a particular game.

Additionally, the functionality of the game frontend development modules disclosed herein may be built as a standalone piece of software, integrated into an existing game development engine (e.g., that controls the visual elements of the game's presentation), or further customized from existing software implementing state machine functionality, and so forth. As stated above, the frontend game development platform may store the modified composable state machines for a particular game in a configuration file, which may, e.g., be distributed across a network and/or to other developers, as desired, leading to quicker deployment of games and less overwriting/duplicating of existing game engine code to provide customized game functionality.

In some examples, the definitions of a backend state machine for an exemplary game may also be stored in a JSON (or other standardized) file format, such as the following:

```
{
  "steps": [ {
    id: "Start",
    type: GDK.States.SimpleState,
    transitions: { standard: "Idle" }
  }, {
    id: "BaseGame",
    type: GDK.States.SimpleState,
    transitions: { standard: "Spin" }
  }, {
    id: "CheckForFeature",
    type: GDK.States.BranchState,
    data: { evaluator: "FeatureEvaluator" },
```

-continued

```
    transitions: {
       true: "PresentFeature",
       false: "BaseGame"
    }
  }, {
    id: "PresentFeature",
    type: GDK.States.SimpleState,
    transitions: { standard: "CheckForFeature" }
  } ]
}
```

The backend state machine example reproduced above shows various steps (or "states"), such as "Start," "BaseGame, "CheckForFeature," and "PresentFeature," each with its own ID, state type, and list of transitions, including in some cases which state should be transitioned to, i.e., in the event that a particular feature evaluates as "true" versus what should happen if the particular feature evaluates as "false."

III.D. Exemplary Methods for Utilizing a General Service Architecture and Flexible Frontend and Backend Platform Design for a Novel Game Development Kit (GDK)

Figure 9:
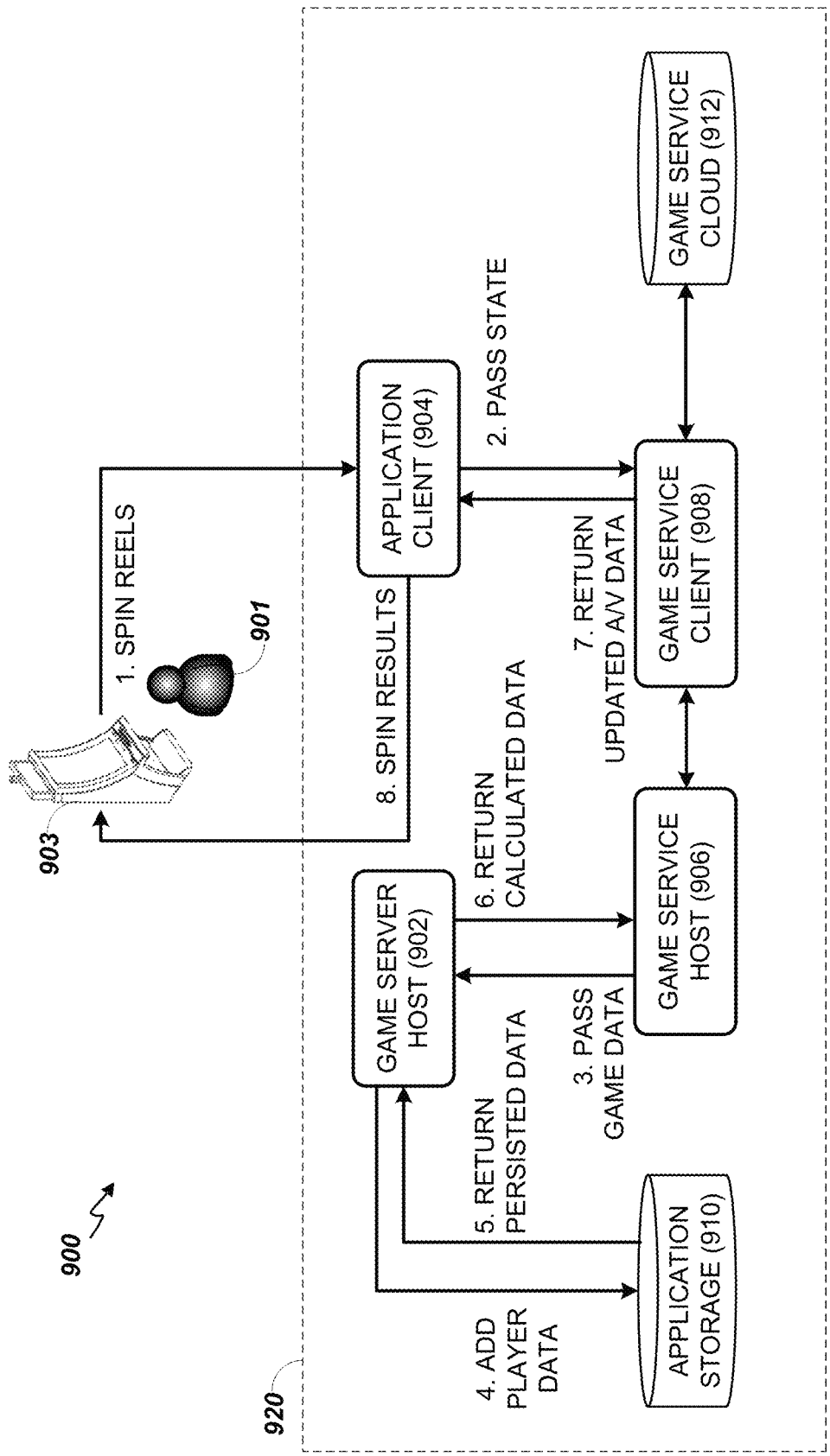
FIG. 9 illustrates, in combined block and flow diagram form, an implementation of a general service architecture and flexible backend platform for a novel GDK, in accordance with various implementations described herein.

FIG. 9 illustrates, in combined block and flow diagram form, an implementation 900 of a general service architecture and flexible backend platform for a novel GDK, in accordance with various implementations described herein. In the example depicted in FIG. 9, a player 901 may begin usage of the general service architecture and flexible backend platform by indicating a request at Step 1, e.g., a "Spin Reels" request, to a gaming device, such as exemplary electronic gaming machine 903. (It is to be understood that the depiction of 903 as an Ara™ model EGM is purely illustrative, and that any electronic gaming device capable of executing a game application, e.g., a mobile device or laptop computer, may be used by the player to access a particular game's functionality.)

In response to the "Spin Reels" request indicated by player 901 at Step 1 in FIG. 9, the game application client (904) receiving the request may then, at Step 2, pass the current state of the game to the game service client (908). Game service client (908) may be in communication with game service host (906) and be hosted on game service cloud (912), e.g., an external system hosted in a cloud environment for executing various game service clients. In some embodiments, game service client (908) may be responsible for passing inputs and outcomes of games between the game application client (904) and the game service host (904). At Step 3, the game service host (904) may pass game data to the backend game server host (902) for further processing. Game server host (902) may, e.g., be comprised of various application programming interfaces (APIs) that expose mathematical operations and/or other game logic to various services.

At Step 4, game server host (902) may add the appropriate player data (e.g., based on a received player ID) to external application storage (910). The player data may comprise an amount of credits a player has remaining, an amount of free games a player has remaining, reel positions, amounts of player winnings, etc. In this way, the application storage (910) may persistently store the data related to a player's game or round of play within a particular game. At Step 5, the appropriate persisted data may be returned to the game server host (902). At this point, game server host (902) may make whatever calculations or mathematical determinations are needed by the game, based on the obtained player data. At Step 6, the results of these data calculations may be returned to game service host (906), which may serve the results to the aforementioned game service client (908). At Step 7, the game service client (908) may return the updated results (e.g., in the form of updates that are to be made to the game's A/V data) to the application client (904) instance that originally made the request (i.e., in this case, the "Spin Reels" request that was made at Step 1). Finally, at Step 8, the application client (904) may employ a game frontend framework to update and display the results of the spin that was just executed by the game backend, e.g., on a display screen of the electronic gaming machine 903.

Figure 10:
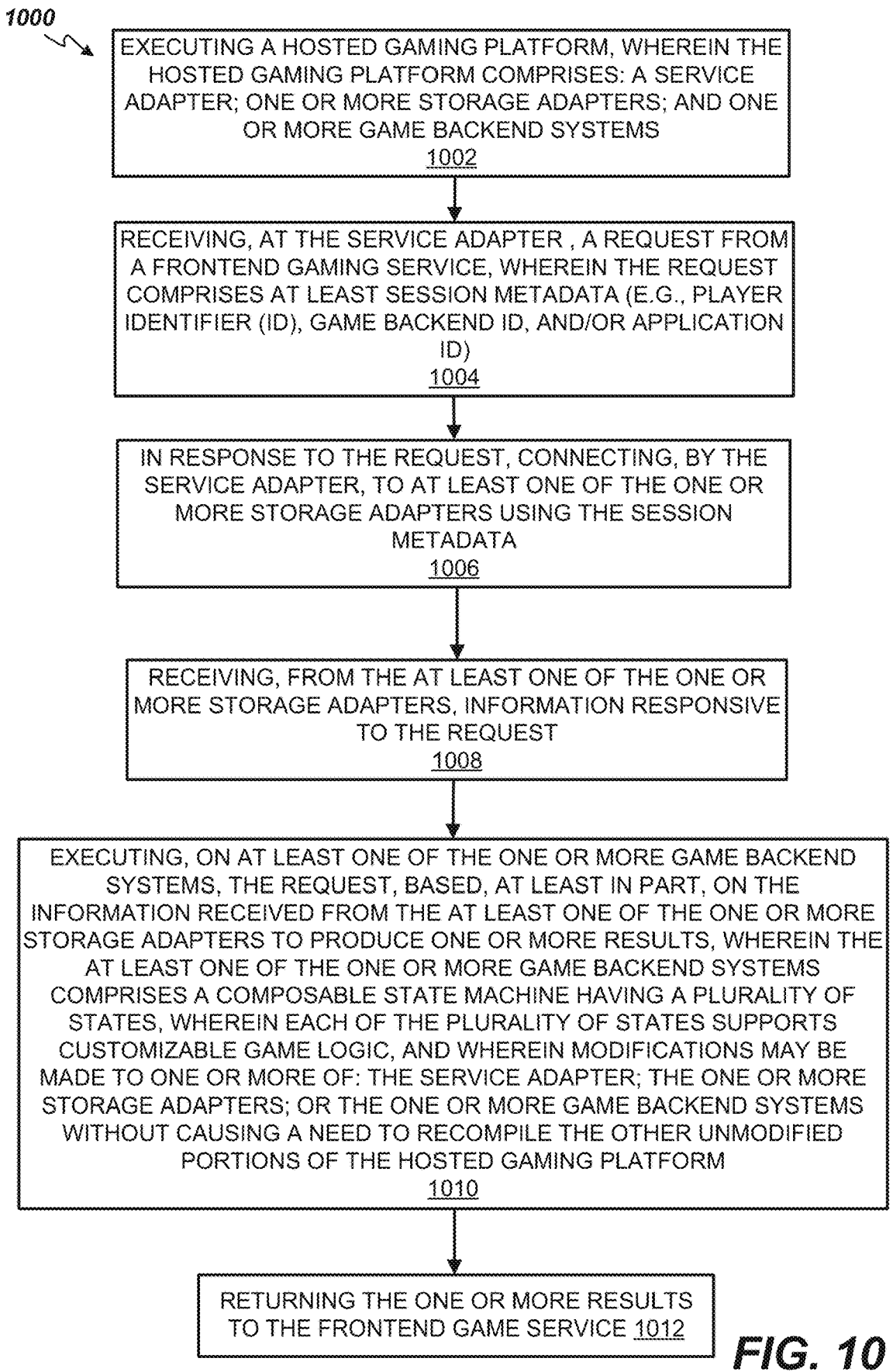
FIG. 10 is a flowchart illustrating an example method for performing an embodiment of the disclosed technology related to a general backend service architecture.

Turning now to FIG. 10, a flowchart is shown, illustrating an example method 1000 for performing an embodiment of the disclosed technology related to a general backend service architecture. First, at 1002, the method 1000 may execute a hosted gaming platform, wherein the hosted gaming platform comprises: a service adapter; one or more storage adapters; and one or more game backend systems (e.g., an extensible slot game engine). At 1004, the hosted gaming platform may receive, at the service adapter, a request from a frontend gaming service, wherein the request comprises at least some session metadata (e.g., a player identifier (ID), game backend ID, and/or an application ID). At 1006, and in response to the request, the method 1000 may connect, by the service adapter, to at least one of the one or more storage adapters using the session metadata information.

At 1008, the hosted gaming platform may then receive, from the at least one of the one or more storage adapters, information responsive to the request. At 1010, the method 1000 may then execute the request on at least one of the one or more game backend systems to produce one or more results, wherein the execution of the request is based, at least in part, on the information received from the at least one of the one or more storage adapters, and wherein the at least one of the one or more game backend systems comprises a composable state machine having a plurality of states, and wherein each of the plurality of states supports customizable game logic. In some embodiments, the hosted gaming platform may be designed, such that modifications may be made to one or more of: the service adapter; the one or more storage adapters; or the one or more game backend systems—without causing a need to recompile the other unmodified portions of the hosted gaming platform. In some such embodiments, this may be achievable by the various components residing within their own code libraries. Finally, at 1012, the one or more results may be returned to the frontend game service, e.g., so that the game may take the appropriate action (e.g., updating the game's UI display with new A/V data reflective of the one or more results).

Figure 11:
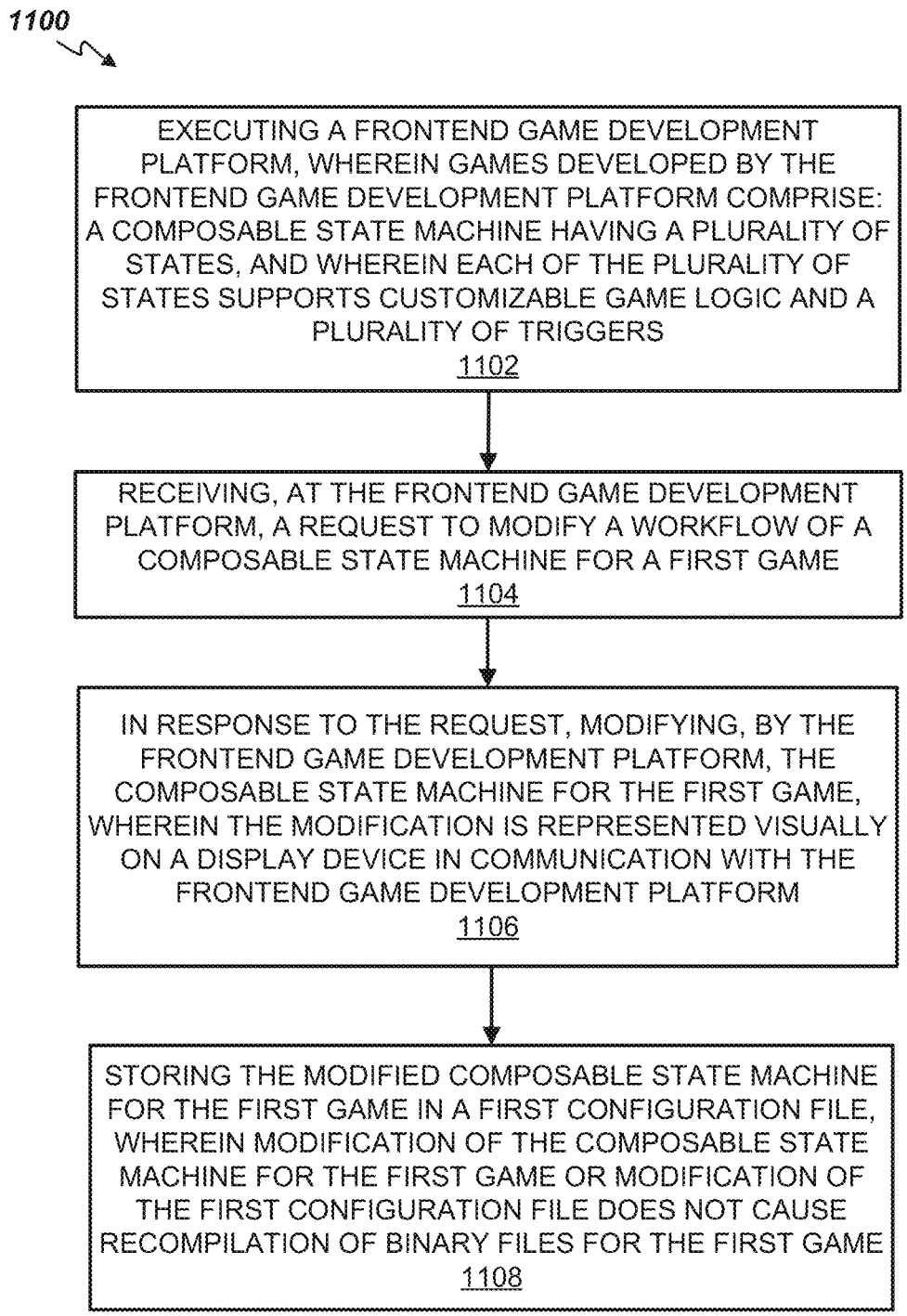
FIG. 11 is a flowchart illustrating an method technique for performing an embodiment of the disclosed technology related to a general frontend game development architecture.

Turning now to FIG. 11, a flowchart is shown, illustrating an example method 1100 for performing an embodiment of the disclosed technology related to a general frontend game development architecture. First, at 1102, the method 1100 may execute a frontend game development platform (e.g., a slot or other wagering-related game platform), wherein games developed by the frontend game development platform comprise: a composable state machine having a plurality of states, and wherein each of the plurality of states supports customizable game logic and a plurality of triggers. At 1104, the frontend game development platform may receive a request to modify a workflow of a composable state machine for a first game.

At 1106, in response to the request, the method 1100 may modify the composable state machine for the first game, wherein the modification is represented visually on a display device in communication with the frontend game development platform. (As mentioned above, in some implementations, the modification beneficially does not cause recompilation of binary files for the first game.) Finally, at 1108, the frontend game development platform may store the modified composable state machine for the first game in a first configuration file, which may, e.g., be distributed across a network and/or to other developers, as desired. In some embodiments, modification of the composable state machine for the first game or modification of the first configuration file does not cause recompilation of binary files for the first game.

As may now be appreciated, the techniques described herein provide methods for developing and delivering games as "content," rather than "code." The techniques described herein create an organized infrastructure and tools that allow developers to keep game-related content aligned and provide out-of-the-box asset management tooling and guidelines. By utilizing a framework of core system components and extensions thereupon, developers may be able to separate game features into componentized modules and create a distribution framework for sharing and/or aligning features, e.g., among developers at the same studio and/or across game development studios. In some embodiments, core system component modules may be developed in a single development environment/repository and then distributed via a distribution repository once they are stable and validated. Advantageously, as new individual gaming modules are being developed, that development can take place alongside the creation and development of the games and other core system components themselves. When such gaming modules are ready to ship, they may also then be pushed to a distribution repository. Similarly, as new games are being developed, that development can also take place alongside the creation and development of the individual game modules and other core system components. According to these techniques, developers are able to pull code packages via the repository, and then further customize them based on their individual needs, after which the customized code may be built into an asset bundle and shared via any desired form of distribution. According to these techniques, individual client entities (e.g., game developers) are also able to develop and customize code for individual components of games, as desired. This development may also occur in a separate repository, and then such client entities may synchronize their customized code packages with whatever code is currently being used in the corresponding game projects. Once the packages have been built, clients can load individual games (or components thereof) as individual assets, provided that they are built with the same packages/versions as the rest of the game project. The software components and tools described herein thus enable games to be easily ported between platforms, while leveraging the unique strengths of each platform. By employing coherent processes and training, more consistent quality may be ensured in the components and tools—as well as in the games built with such tools.

IV. Alternatives, Variations, and Conclusion

Numerous embodiments are described in this disclosure and are presented for illustrative purposes only. The described embodiments are not, and are not intended to be, limiting in any sense. The present disclosure is widely applicable to numerous embodiments, as is readily apparent from the disclosure. One of ordinary skill in the art will recognize that the innovations described herein may be practiced with various modifications and alterations, such as structural, logical, software, and electrical modifications. Although particular features of the innovations described herein may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the innovations described herein that must be present in all embodiments.

The Title (set forth at the beginning of the first page of this disclosure) is not to be taken as limiting in any way as the scope of the disclosed embodiments.

When an ordinal number (such as "first," "second," "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget." Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When introducing elements of aspects of the present disclosure or embodiments thereof, the articles "a," "an," "the," and "said" are intended to mean that there are one or more of the elements. The terms "comprising," including," and "having" are intended to be inclusive and mean that there may be additional elements other than the listed elements.

When a single device, component, structure, or article is described herein, more than one device, component, structure or article (whether or not they cooperate) may alternatively be used in place of the single device, component or article that is described. Accordingly, the functionality that is described as being possessed by a device may alternatively be possessed by more than one device, component or article (whether or not they cooperate).

Similarly, where more than one device, component, structure, or article is described herein (whether or not they cooperate), a single device, component, structure, or article may alternatively be used in place of the more than one device, component, structure, or article that is described. For example, a plurality of computer-based devices may be substituted with a single computer-based device. Accordingly, the various functionality that is described as being possessed by more than one device, component, structure, or article may alternatively be possessed by a single device, component, structure, or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Further, the systems and methods described herein are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the innovations described herein. Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the innovations described herein, and does not imply that the illustrated process is preferred.

Although a process may be described as including a plurality of steps, that does not indicate that all or even any of the steps are essential or required. Various other embodiments within the scope of the present disclosure include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the present disclosure include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

For the sake of presentation, the detailed description uses terms like "determine" and "select" to describe computer operations in a computer system. These terms denote operations performed by a computer, and should not be confused with acts performed by a human being. The actual computer operations corresponding to these terms vary depending on implementation. For example, "determining" something can be performed in a variety of manners, and therefore the term "determining" (and like terms) can indicate calculating, computing, deriving, looking up (e.g., in a table, database or data structure), ascertaining, recognizing, and the like.

As used herein, the term "send" denotes any way of conveying information from one component to another component, and the term "receive" denotes any way of getting information at one component from another component. The two components can be part of the same computer system or different computer systems. The information can be passed by value (e.g., as a parameter of a message or function call) or passed by reference (e.g., in a buffer). Depending on context, the information can be communicated directly between the two components or be conveyed through one or more intermediate components. As used herein, the term "connected" denotes an operable communication link between two components, which can be part of the same computer system or different computer systems. The operable communication link can be a wired or wireless network connection, which can be direct or pass through one or more intermediate components (e.g., of a network). Communication among computers and devices may be encrypted to insure privacy and prevent fraud in any of a variety of ways well known in the art.

It will be readily apparent that the various methods and algorithms described herein may be implemented by, e.g., appropriately programmed general-purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium for performing the process. The apparatus that performs the process can include components and devices (e.g., a processor, input and output devices) appropriate to perform the process. A computer-readable medium can store program elements appropriate to perform the method.

The term "computer-readable medium" refers to any non-transitory storage or memory that may store computer-executable instructions or other data in a computer system and be read by a processor in the computer system. A computer-readable medium may take many forms, including but not limited to non-volatile storage or memory (such as optical or magnetic disk media, a solid-state drive, a flash drive, PROM, EPROM, and other persistent memory) and volatile memory (such as DRAM). The term "computer-readable media" excludes signals, waves, and wave forms or other intangible or transitory media that may nevertheless be readable by a computer.

The present disclosure provides, to one of ordinary skill in the art, an enabling description of several embodiments and/or innovations. Some of these embodiments and/or innovations may not be claimed in the present application, but may nevertheless be claimed in one or more continuing applications that claim the benefit of priority of the present application. Applicants may file additional applications to pursue patents for subject matter that has been disclosed and enabled but not claimed in the present application.

The foregoing description discloses only exemplary embodiments of the present disclosure. Modifications of the above disclosed apparatus and methods which fall within the scope of the present disclosure will be readily apparent to those of ordinary skill in the art. For example, although the examples discussed above are illustrated for a gaming market, embodiments of the present disclosure can be implemented for other markets. The gaming system environment of the examples is not intended to suggest any limitation as to the scope of use or functionality of any aspect of the disclosure.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. A system, comprising:
one or more processors;
a memory; and
control logic, implemented using the one or more processors and the memory, configured to perform operations, comprising:
executing a hosted gaming platform, wherein the hosted gaming platform comprises: a service adapter; one or more storage adapters; and one or more game backend systems;
receiving, at the service adapter, a request from a frontend gaming service, wherein the request comprises at least session metadata;
in response to the request, connecting, by the service adapter, to at least one of the one or more storage adapters using the session metadata;
receiving, from the at least one of the one or more storage adapters, information responsive to the request;
executing, on at least one of the one or more game backend systems, the request, based, at least in part, on the information received from the at least one of the one or more storage adapters to produce one or more results, wherein the at least one of the one or more game backend systems comprises a composable state machine having a plurality of states, wherein each of the plurality of states supports customizable game logic, and wherein modifications may be made to one or more of: the service adapter; the one or more storage adapters; or the one or more game backend systems without causing a need to recompile other unmodified portions of the hosted gaming platform; and
returning the one or more results to the frontend game service.

2. The system of claim 1, wherein at least one of the one or more game backend systems further comprises an extensible slot game engine.

3. The system of claim 1, wherein the hosted gaming platform is hosted on a third-party cloud service provider or one or more local servers.

4. The system of claim 1, wherein the hosted gaming platform comprises a multi-threaded architecture.

5. The system of claim 1, wherein each of the one or more storage adapters are connected to an external database.

6. The system of claim 5, wherein a first one of the one or more storage adapters is connected to a first type of external database and a second one of the one or more storage adapters is connected to a second type of external database, and wherein the first and second types of external databases are different.

7. The system of claim 1, wherein the frontend gaming service is configured to connect to the hosted gaming platform via one or more of: a Representational State Transfer (REST) Application Programming Interface (API), a WebSocket, or a Protocol Buffer.

8. The system of claim 1, wherein the hosted gaming platform further comprises a Math Verification Controller (MVC).

9. The system of claim 1, wherein the request comprises at least one of: a spin request; a jackpot request; or a join request.

10. The system of claim 1, wherein each of the plurality of states is: removable, re-writable, and re-orderable.

11. A method for executing a hosted gaming platform, wherein the hosted gaming platform comprises: a service adapter; one or more storage adapters; and one or more game backend systems, the method comprising:
receiving, at the service adapter, a request from a frontend gaming service, wherein the request comprises at least session metadata;
in response to the request, connecting, by the service adapter, to at least one of the one or more storage adapters using the session metadata;
receiving, from the at least one of the one or more storage adapters, information responsive to the request;
executing, on at least one of the one or more game backend systems, the request, based, at least in part, on the information received from the at least one of the one or more storage adapters to produce one or more results, wherein the at least one of the one or more game backend systems comprises a composable state machine having a plurality of states, wherein each of the plurality of states supports customizable game logic, and wherein modifications may be made to one or more of: the service adapter; the one or more storage adapters; or the one or more game backend systems without causing a need to recompile other unmodified portions of the hosted gaming platform; and returning the one or more results to the frontend game service.

12. The method of claim 11, wherein at least one of the one or more game backend systems further comprises an extensible slot game engine.

13. The method of claim 11, wherein the hosted gaming platform is hosted on a third-party cloud service provider or one or more local servers.

14. The method of claim 11, wherein the hosted gaming platform comprises a multi-threaded architecture.

15. The method of claim 11, wherein each of the one or more storage adapters are connected to an external database.

16. One or more computer-readable media storing computer-executable instructions, which, when executed by a computer, cause the computer to perform the following operations:

executing a hosted gaming platform, wherein the hosted gaming platform comprises: a service adapter; one or more storage adapters; and one or more game backend systems;

receiving, at the service adapter, a request from a frontend gaming service, wherein the request comprises at least session metadata;

in response to the request, connecting, by the service adapter, to at least one of the one or more storage adapters using the session metadata;

receiving, from the at least one of the one or more storage adapters, information responsive to the request;

executing, on at least one of the one or more game backend systems, the request, based, at least in part, on the information received from the at least one of the one or more storage adapters to produce one or more results, wherein the at least one of the one or more game backend systems comprises a composable state machine having a plurality of states, wherein each of the plurality of states supports customizable game logic, and wherein modifications may be made to one or more of: the service adapter; the one or more storage adapters; or the one or more game backend systems without causing a need to recompile other unmodified portions of the hosted gaming platform; and returning the one or more results to the frontend game service.

17. The one or more computer-readable media of claim 16, wherein the frontend gaming service is configured to connect to the hosted gaming platform via one or more of: a Representational State Transfer (REST) Application Programming Interface (API), a WebSocket, or a Protocol Buffer.

18. The one or more computer-readable media of claim 16, wherein the hosted gaming platform further comprises a Math Verification Controller (MVC).

19. The one or more computer-readable media of claim 16, wherein the request comprises at least one of: a spin request; a jackpot request; or a join request.

20. The one or more computer-readable media of claim 16, wherein each of the plurality of states is: removable, re-writable, and re-orderable.

* * * * *